United States Patent Office 3,362,590
Patented Jan. 9, 1968

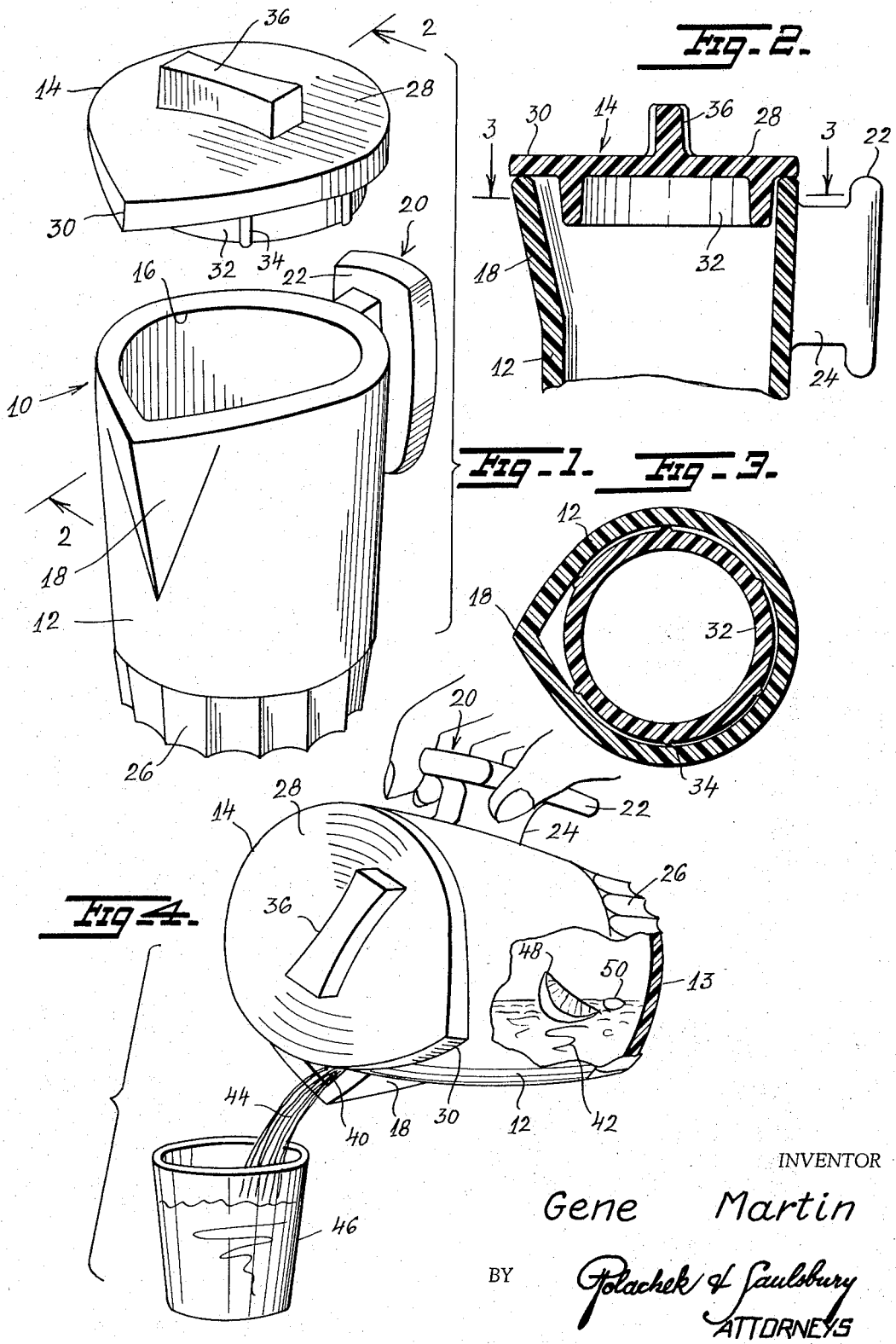

3,362,590
CARAFE
Gene Martin, East Meadow, N.Y.
(156 N. Franklin St., Hempstead, N.Y. 11550)
Filed Oct. 7, 1965, Ser. No. 493,775
1 Claim. (Cl. 222—465)

This invention relates generally to carafes or pitchers particularly designated for bedside use in hospitals.

A principal object of the present invention is to provide a carafe or pitcher that is disposable and serves as an insulated bottle.

Another object of the invention is to provide a carafe or pitcher that prevents cross infection through water carafes.

Yet another object is to provide a carafe that is durable and lasting.

Still another object is to provide a carafe or pitcher that is suitable for bedside use in hospitals which eliminates autoclaving and reprocessing of ordinary carafes, for issuance to new patients in the hospital.

A further object is to provide a carafe or pitcher of the kind described that is light in weight, attractive, easy to clean, dustfree, tasteless, odorless, will not get soggy, will not collect outside condensation, not subject to fungus attack or bacterial growth, sanitary, leakproof and shock resistant.

It is also an object to provide a carafe or pitcher of this kind that has a positive grip, a protective cover and a dripless pouring spout and is resistant to heat and water.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a carafe or pitcher embodying my invention, the cover being shown removed.

FIG. 2 is a vertical sectional view taken on the line 2—2 of FIG. 1.

FIG. 3 is a cross-sectional view taken on the line 3—3 of FIG. 2.

FIG. 4 is a perspective view showing the carafe or pitcher in use, a liquid being shown poured into a glass, parts being shown broken away.

Referring now in detail to the various views of the drawing wherein similar reference numerals are used to indicate similar parts thereof, in FIG. 1 a carafe or pitcher made in accordance with the present invention is shown and designated generally at 10. The carafe comprises a vessel or body 12 and a removable cover 14. The vessel or body and cover are formed of plastic material such as expanded polystyrene marketed under the tradename "Vacucel," which material is light in weight, dustfree, tasteless, odorless, cannot get soggy, will not collect outside condensation, is not subject to fungus attack or bacterial growth, is leakproof, shock resistant and resistant to heat and water. The body 12 is slightly tapered from the top downwardly to the bottom 13 being open at the top thereby providing a wide mouth 16.

A tapering spout 18, of flattened V-shape is formed at the front of the body intersecting the open mouth 16 at the top of the body. A handle structure 20 is formed integrally with the body opposite the spout 18, said handle structure including a substantially flat hand grip 22 joined to the body by a web portion 24. The top of the grip 22 is flush with the top of the body thereby providing a balanced structure. The material makes the grip positive and slip-proof. The outer surface of the bottom end of the body 12 is fluted as indicated at 26 to serve as a hand grip.

The lid or cover 14 has a flat body 28 corresponding in shape to the open mouth 16 of the body 12, which flat body is substantially circular with a pointed lip portion 30 similar in shape and size to the top edge of the spout 18 so that when the lid or cover is seated on top of the body, the lip portion 28 corresponds in shape and size to the top edge of the spout, seating thereon as shown in FIG. 2, the lid or cover closing the mouth 16 of the body of the carafe. An annular depending flange 32 is formed integrally with the bottom surface of the flat body 28 and is spaced inwardly from the peripheral edge of the body 28. A series of spaced ribs 34 are formed on the flange 30 disposed transversely thereof and provide means for frictionally holding the lid or cover in operative closing position on the top of the body, the ribs adapted to contact the inner surface of the body, except opposite the spout 18. An elongated solid handle 36 rectangular in plan is formed on the top surface of the flat body 28 centrally thereof for manipulating the lid or cover.

In use, the carafe is especially suitable for holding drinks, beverages, fruit cocktails and the like. Cold drinks and beverages will remain cold for a considerable time. The production of the carafe is so economical that it can be discarded after a single use by a patient in a hospital. The liquid in the carafe may be readily discharged by simply turning the lid or cover 14 any distance desired therearound, thereby providing a discharge outlet 40 as seen in FIG. 4. In FIG. 4, the carafe is shown as containing a fruit cocktail 42 and only the liquid portion 44 thereof is escaping through the discharge outlet 40 into a glass 46, the sliced fruit 48 and seeds 50 being held back by the lid or cover.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

1. A disposable bedside carafe comprising a hollow elongated slightly tapering cylindrical body closed at the bottom and open at the top, a spout formed in the body at the top thereof and a removable lid closing the open top of the body, said lid shaped to conform to the shape of the opening in the top of the body and to the shape of top of the spout so that upon turning the lid a discharge outlet is provided for the discharge of the contents of the body, said outlet being restricted whereby only liquid contents may escape therethrough, the solid contents being held back by the lid, an annular depending flange on the undersurface of the lid inwardly of the peripheral edge thereof and spaced transverse ribs on the flange for frictionally engaging the inner surface of the body to hold the lid in adjusted position, an integral handle on the body on the outer surface thereof opposite the spout for manipulating the body of the carafe, said handle having a flat hand grip flush with the top of the body providing a balanced structure, a transverse upstanding handle on the flat body of the lid centrally thereof for manipulating the lid, and a tapered fluted portion at the bottom of the body, the lid having a pointed lip portion seating on the top edge of the spout when the lid is in operative closed position.

References Cited

UNITED STATES PATENTS

| | | | |
|---|---|---|---|
| 1,045,993 | 12/1912 | Lucas | 222—556 |
| 1,410,375 | 3/1922 | Ciesielska | 222—556 |
| 1,547,731 | 7/1925 | Boyer | 222—557 |
| 1,966,982 | 7/1934 | Jones | 222—455 |
| 2,351,395 | 6/1944 | Broder | 206—56 |
| 2,817,451 | 12/1957 | Giles et al. | 222—548 |
| 3,118,562 | 1/1964 | Whitney | 220—42 |
| 3,140,020 | 7/1964 | Spier | 222—557 |

ROBERT B. REEVES, *Primary Examiner.*

HADD S. LANE, *Examiner.*